US012580626B2

(12) United States Patent
Chou et al.

(10) Patent No.: US 12,580,626 B2
(45) Date of Patent: Mar. 17, 2026

(54) BEAM SWITCHING SYSTEM, BEAM SWITCHING METHOD, AND ANTENNA APPARATUS

(71) Applicant: RichWave Technology Corp., Taipei (TW)

(72) Inventors: Chien-Chang Chou, Taipei (TW); Jyun-Wei Chang, Taipei (TW)

(73) Assignee: RichWave Technology Corp., Taipei (TW)

( * ) Notice: Subject to any disclaimer, the term of this patent is extended or adjusted under 35 U.S.C. 154(b) by 33 days.

(21) Appl. No.: 18/539,266

(22) Filed: Dec. 14, 2023

(65) Prior Publication Data

US 2025/0150147 A1 May 8, 2025

(30) Foreign Application Priority Data

Nov. 3, 2023 (TW) .................................. 112142407

(51) Int. Cl.
H04B 7/06 (2006.01)
H04W 36/06 (2009.01)
(52) U.S. Cl.
CPC .......... H04B 7/0695 (2013.01); H04W 36/06 (2013.01)
(58) Field of Classification Search
CPC .. H04B 7/0617; H04B 7/0408; H04B 7/0695; H04B 1/40; H04B 1/18; H04B 7/04; H04B 1/401; H01Q 3/40; H01Q 3/34; H01Q 3/32; H01Q 3/36; H01Q 3/24; H01Q 25/00; H04W 36/06; H03H 7/20; H03H 11/16; H03H 7/19
See application file for complete search history.

(56) References Cited

U.S. PATENT DOCUMENTS

| | | | | |
|---|---|---|---|---|
| 5,008,678 A | * | 4/1991 | Herman | ................ G01S 13/931 342/158 |
| 7,795,966 B2 | * | 9/2010 | Wyse | ........................ H03F 3/24 330/207 P |
| 9,634,389 B2 | * | 4/2017 | Tseng | ..................... H01Q 3/385 |

(Continued)

FOREIGN PATENT DOCUMENTS

| | | |
|---|---|---|
| JP | H06140959 A | 5/1994 |
| JP | 2007251589 A | 9/2007 |
| JP | 2014131115 A | 7/2014 |

OTHER PUBLICATIONS

Cetinoneri et al., "An 8+8 Butler Matrix in 0.13–μm CMOS for 5-6-GHz Multibeam Applications," in IEEE Transactions on Microwave Theory and Techniques, vol. 59, No. 2, pp. 295-301, Feb. 2011, doi: 10.1109/TMTT.2010.2097751. (Year: 2011).*

(Continued)

*Primary Examiner* — Sophia Vlahos
(74) *Attorney, Agent, or Firm* — JCIPRNET

(57) ABSTRACT

A beam switching system, beam switching method, and antenna device are provided. The beam switching system includes a selection circuit and a branch line coupler. The selection circuit includes an input port for receiving the input radio frequency signal and two output ports. The selection circuit selects at least one of its two output ports to output the output radio frequency signal. The branch line coupler includes two input ports respectively coupled to two output ports of the selection circuit and used to receive the output radio frequency signal, and two output ports respectively used to couple two antennas.

18 Claims, 10 Drawing Sheets

(56) References Cited

U.S. PATENT DOCUMENTS

| | | | | |
|---|---|---|---|---|
| 9,866,260 | B2 * | 1/2018 | Ilkov .................... | H04B 1/0458 |
| 10,530,448 | B1 * | 1/2020 | Tran ..................... | H04B 7/0617 |
| 11,564,064 | B2 | 1/2023 | Hormis et al. | |
| 2007/0069948 | A1 | 3/2007 | Liu | |
| 2007/0146097 | A1 * | 6/2007 | Lapin .................... | H03H 7/185 |
| | | | | 333/161 |
| 2009/0253387 | A1 * | 10/2009 | Van Rensburg ....... | H01Q 25/00 |
| | | | | 455/90.2 |
| 2012/0021697 | A1 | 1/2012 | Yang | |
| 2014/0139373 | A1 | 5/2014 | Tseng et al. | |
| 2016/0047909 | A1 * | 2/2016 | Pu .......................... | G01S 13/48 |
| | | | | 342/27 |
| 2017/0062948 | A1 * | 3/2017 | Artemenko .......... | H04B 7/0617 |
| 2017/0331528 | A1 * | 11/2017 | Gamand .............. | H04B 7/0408 |
| 2018/0373909 | A1 * | 12/2018 | Nikitin ................. | H04B 7/0802 |
| 2019/0334597 | A1 | 10/2019 | Chen et al. | |
| 2020/0112328 | A1 * | 4/2020 | Andersson ............... | H04B 1/44 |
| 2020/0314601 | A1 * | 10/2020 | Hormis ................. | H04W 16/28 |
| 2022/0131253 | A1 | 4/2022 | Natarajan et al. | |

OTHER PUBLICATIONS

"Office Action of Taiwan Counterpart Application", issued on Nov. 25, 2024, p. 1-p. 7.
"Office Action of Japan counterpart Application", issued on Oct. 14, 2025, p. 1-p. 2.
"partial search report of Europe counterpart Application", issued on Mar. 13, 2025, p. 1-p. 14.
"search report of Europe counterpart Application", issued on Jun. 4, 2025, p. 1-p. 13.

* cited by examiner

123

BEAM SWITCHING SYSTEM, BEAM SWITCHING METHOD, AND ANTENNA APPARATUS

CROSS-REFERENCE TO RELATED APPLICATION

This application claims the priority benefit of Taiwan application serial no. 112142407, filed on Nov. 3, 2023. The entirety of the above-mentioned patent application is hereby incorporated by reference herein and made a part of this specification.

BACKGROUND

Technical Field

The application relates to an antenna technology, and in particular, to a beam switching system, a beam switching method, and an antenna apparatus.

Description of Related Art

The antenna device can generate two radiation field patterns through dual antennas. However, to generate more radiation field patterns, more antennas are needed and the system design is more complex.

SUMMARY

The present invention provides a beam switching system, a beam switching method, and an antenna apparatus.

The beam switching system of the embodiment of the present invention includes a selection circuit and a branch line coupler. The selection circuit includes an input port for receiving the input radio frequency signal and two output ports. The selection circuit selects at least one of its two output ports to output the output radio frequency signal. The branch line coupler includes two input ports respectively coupled to two output ports of the selection circuit and used to receive the output radio frequency signal, and two output ports respectively used to couple two antennas.

The beam switching method of the embodiment of the present invention includes the following steps: providing a beam switching system; generating a control signal according to a beam direction; and selecting at least one of two output ports to output an output radio frequency signal according to the control signal.

The antenna apparatus of the embodiment of the present invention includes two antennas, a selection circuit and a branch line coupler. The selection circuit includes an input port for receiving the input radio frequency signal and two output ports. The selection circuit selects at least one of its two output ports to output the output radio frequency signal. The branch line coupler includes two input ports respectively coupled to two output ports of the selection circuit and used to receive the output radio frequency signal, and two output ports respectively used to couple the two antennas.

In order to make the above-mentioned features and advantages of the present invention more obvious and easier to understand, embodiments are given below and described in detail with reference to the attached drawings.

DESCRIPTION OF THE EMBODIMENTS

Figure 1:
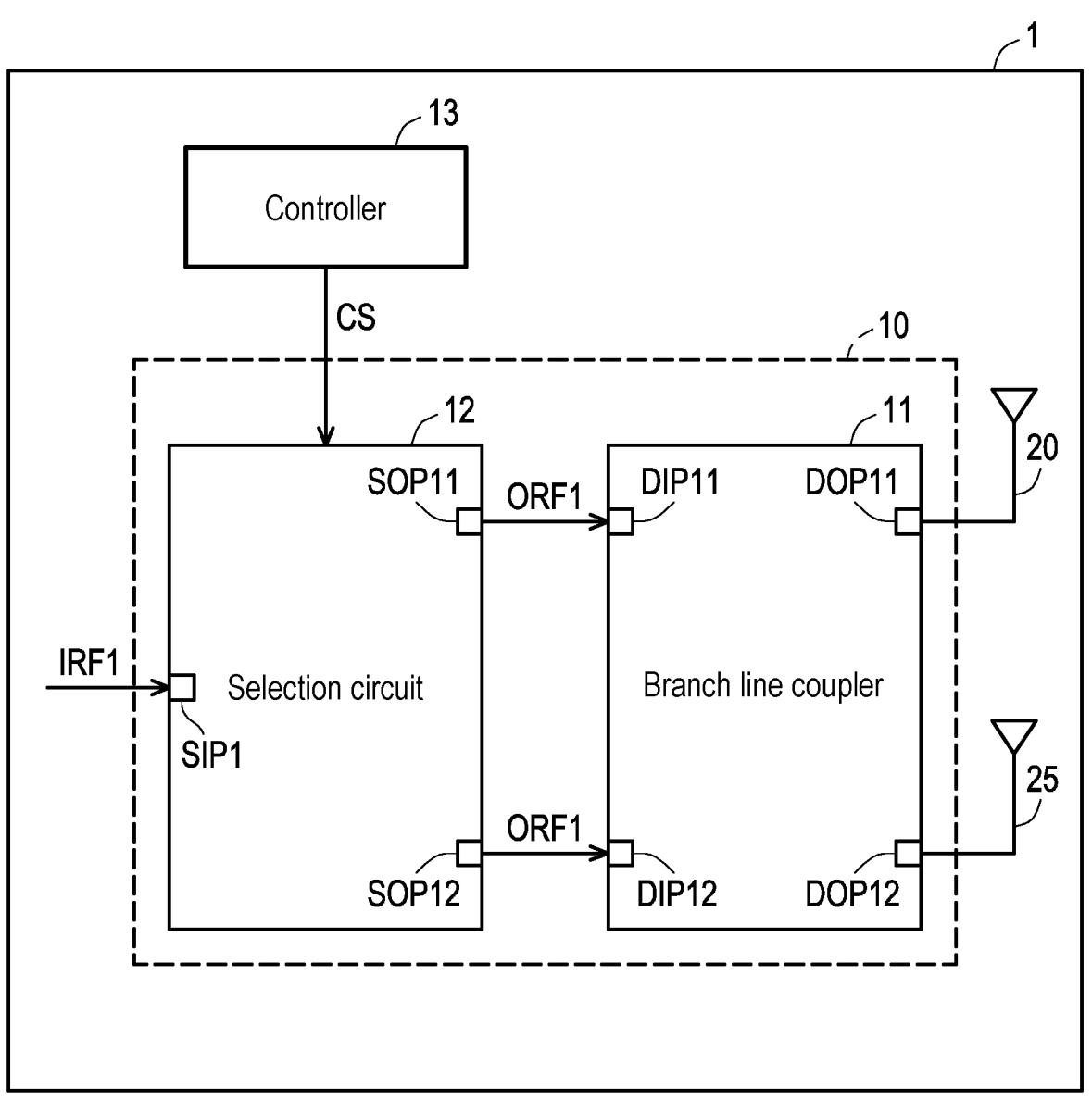
FIG. 1 is a block diagram of an antenna apparatus according to an embodiment of the present invention.

FIG. 1 is a block diagram of an antenna apparatus 1 according to an embodiment of the present invention. Referring to FIG. 1, the antenna apparatus 1 includes (but is not limited thereto) a beam switching system 10, a controller 13 and two antennas 20, 25.

The beam switching system 10 includes a branch line coupler 11 and a selection circuit 12.

The branch line coupler 11 includes two input ports DIP11, DIP12 and two output ports DOP11, DOP12.

The two input ports DIP11, DIP12 is coupled to the selection circuit 12. The two input ports DIP11, DIP12 are used to receive an output radio frequency signal ORF1 from the selection circuit 12.

The two output ports DOP11, DOP12 are respectively used to couple the two antennas 20, 25.

In an embodiment, the branch line coupler 11 inputs the output radio frequency signal ORF1 to one of the two input ports DIP11, DIP12 in a first mode, which has a phase difference with the signal output from the two output ports DOP11, DOP12. The phase difference is, for example, 45°, 90° or 135°, but is not limited thereto. Taking the phase difference of 90° as an example, in the first mode, the two output ports DOP11 and DOP12 output signals with the phase difference of 90°.

In an embodiment, the branch line coupler 11 simultaneously inputs the output radio frequency signal ORF1 to the two input ports DIP11 and DIP12 in a second mode, which has the same phase as the signal output from the two output ports DOP11 and DOP12. In the second mode, the two output ports DOP11, DOP12 output signals with a phase difference of 0° (i.e., have the same phase).

The selection circuit 12 includes an input port SIP1 and two output ports SOP11, SOP12. The input port SIP1 is used to receive an input radio frequency signal IRF1.

The two output ports SOP11, SOP12 are respectively coupled to the two input ports DIP11, DIP12 of the branch line coupler 11.

The selection circuit 12 selects at least one of the two output ports SOP11, SOP12 (such as, selects the output port SOP11, selects the output port SOP12 or selects the output ports SOP11, SOP12 both) to output the output radio frequency signal ORF1.

The detailed hardware architecture of the antenna apparatus 1 is described in more detail below with FIG. 2A to FIG. 2D.

Figure 2A:
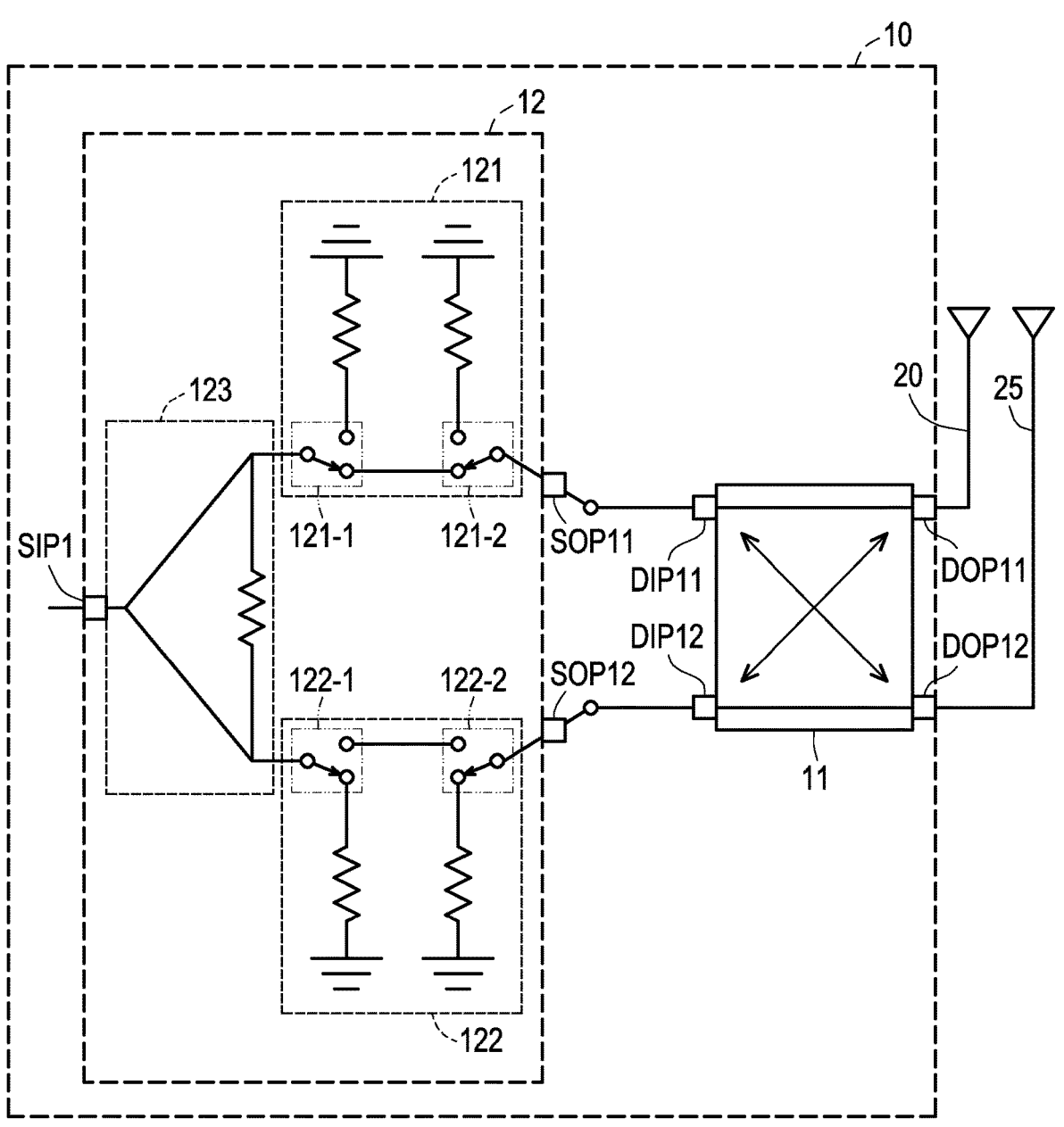
FIG. 2A is a schematic diagram of a beam switching system and antennas according to an embodiment of the present invention.

FIG. 2A is a schematic diagram of a beam switching system 10 and antennas 20, 25 according to an embodiment of the present invention. Referring to FIG. 2A, the selection circuit 12 includes switching circuits 121, 122.

Figure 2B:
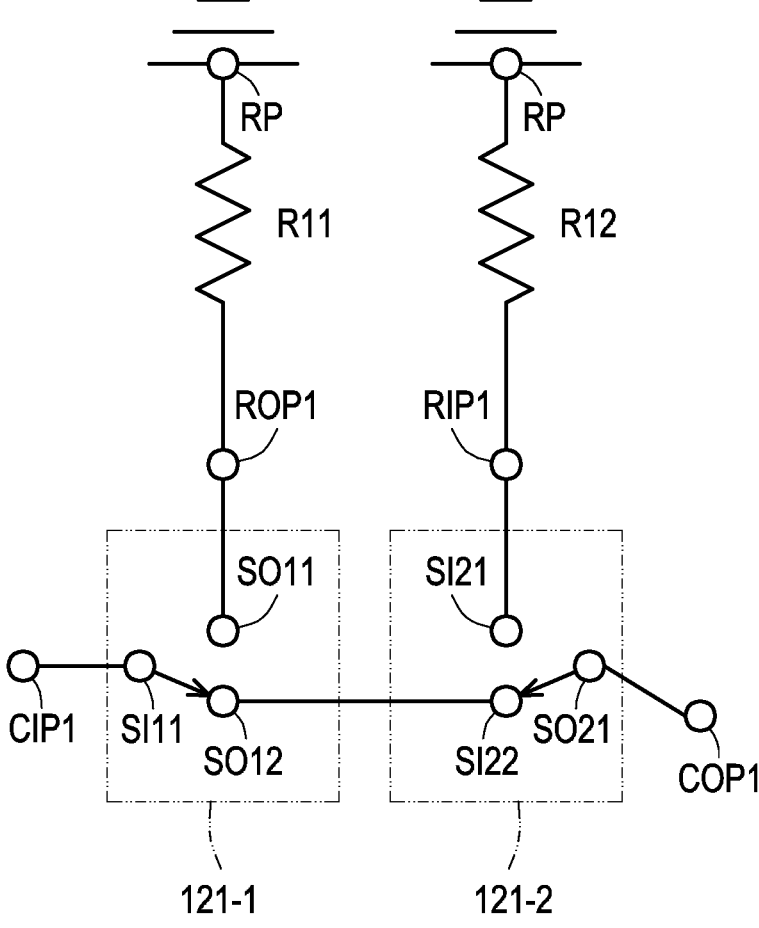
FIG. 2B is a schematic diagram of a switching circuit according to an embodiment of the present invention.

FIG. 2B is a schematic diagram of the switching circuit 121 according to an embodiment of the present invention. Referring to FIG. 2A and FIG. 2B, the switching circuit 121 includes an input port CIP1, an output port COP1 and reference ports ROP1, RIP1. The input port CIP1 of the switching circuit 121 is coupled to the input port SIP1 of the selection circuit 12, the output port COP1 is coupled to the output port SOP11 of the selection circuit 12, and the reference ports ROP1, RIP1 are respectively coupled to the reference potential port RP (for example, ground or other reference potential).

In an embodiment, the switching circuit 121 includes switches 121-1, 121-2.

The switch 121-1 includes an input port SI11 and two output ports SO11, SO12. The input port SI11 of the switch 121-1 is coupled to the input port CIP1, the output port SO11 is coupled to the reference port ROP1, and the output port SO12 is coupled to the switch 121-2. The switch 121-1 selectively turns on the input port SI11 and the output port SO11 and turns off the input port SI11 and output port SO12, or turns on the input port SI11 and the output port SO12 and turns off the input port SI11 and the output port SO11. In the embodiment of the present invention, turning on two ports refers to turning on the electrical path between the two ports, and turning off two ports refers to turning off the electrical path between the two ports.

The switch 121-2 includes two input ports SI21, SI22 and an output port SO21. The input ports SI21, SI22 of the switch 121-2 are respectively coupled to the reference port RIP1 and the output port SO12 of the switch 121-1, and the output port SO21 is coupled to the output port COP1. The switch 121-2 selectively turns on the input port SI21 and the output port SO21 and turns off the input port SI22 and the output port SO21, or turns on the input port SI22 and the output port SO21 and turns off the input port SI21 and the output port SO21.

In an embodiment, the switching circuit 121 includes impedance elements R11, R12.

The output port SO11 of the switch 121-1 is coupled to the reference potential port RP through the reference port ROP1, and the impedance element R11.

The input port SI21 of the switch 121-2 is coupled to the reference potential port RP through the reference port RIP1, and the impedance element R12.

In an embodiment, the impedance elements R11, R12 has the same impedance value.

Figure 2C:
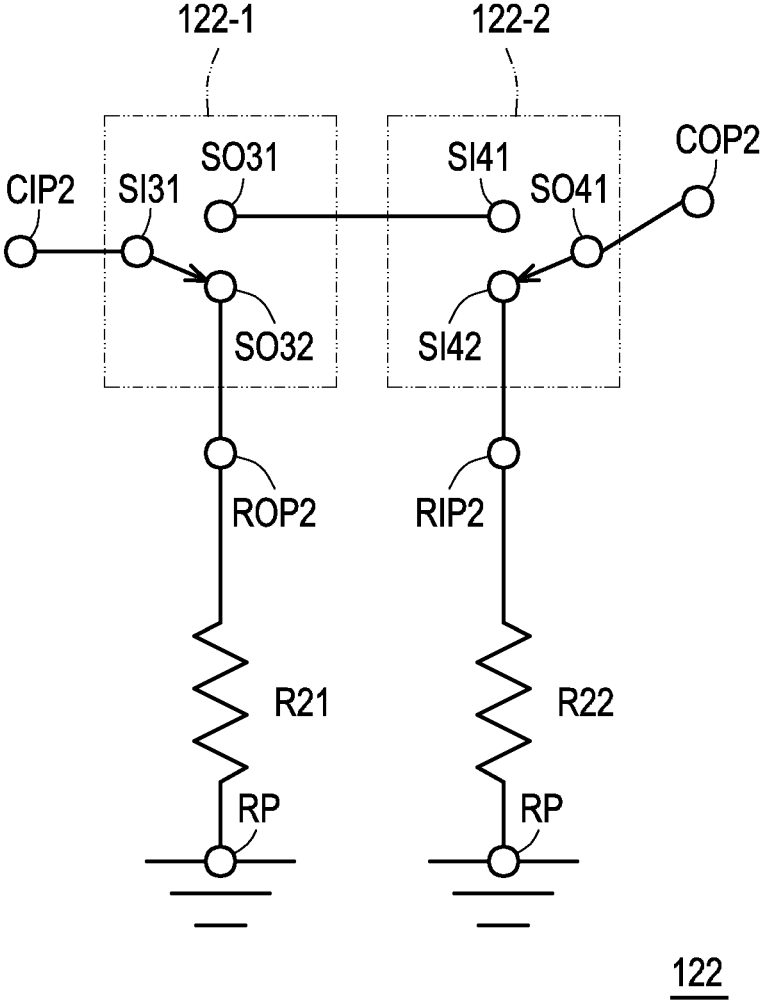
FIG. 2C is a schematic diagram of another switching circuit according to an embodiment of the present invention.

FIG. 2C is a schematic diagram of another switching circuit 122 according to an embodiment of the present invention. Referring to FIG. 2A and FIG. 2C, the switching circuit 122 includes an input port CIP2, an output port COP2 and reference ports ROP2, RIP2. The input port CIP2 of the switching circuit 122 is coupled to the input port SIP1 of the selection circuit 12, the output port COP2 is coupled to the output port SOP12 of the selection circuit 12, and the reference ports ROP2, RIP2 are coupled to the reference potential port RP (such as, ground or other reference potential).

In an embodiment, the switching circuit 122 includes switches 122-1, 122-2.

The switch 122-1 includes an input port SI31 and two output ports SO31, SO32. The input port SI31 of the switch 122-1 is coupled to the input port CIP2, the output port SO31 is coupled to the switch 122-2, and the output port SO32 is coupled to the reference port ROP2. The switch 122-1 selectively turns on the input port SI31 and the output port SO31 and turns off the input port SI31 and the output port SO32, or turns on the input port SI31 and the output port SO32 and turns off the input port SI31 and the output port SO31.

The switch 122-2 includes two input ports SI41, SI42 and a output port SO41. The input ports SI41 and SI42 of the switch 122-2 are respectively coupled to the output port SO31 and the reference port RIP2 of the switch 122-1, and the output port SO41 is coupled to the output port COP2. The switch 122-2 selectively turns on the input port SI41 and the output port SO41 and turns off the input port SI42 and the output port SO41, or turns on the input port SI42 and the output port SO41 and turns off the input port SI41 and the output port SO41.

In an embodiment, the switching circuit 122 includes impedance elements R21, R22.

The output port SO32 of the switch 122-1 is coupled to the reference potential port RP through the reference port ROP2, and the impedance element R21.

The input port SI42 of the switch 122-2 is coupled to the reference potential port RP through the reference port RIP2, and the impedance element R22.

In an embodiment, the impedance elements R21, R22 have the same impedance value. In an embodiment, the impedance elements R12, R22 match the impedance of the two input ports DIP11, DIP12 of the branch line coupler 11. In an embodiment, the impedance elements R11, R12, R21, R22 have the same impedance value.

Referring to FIG. 2A, in an embodiment, the selection circuit 12 includes a power divider 123.

Figure 2D:
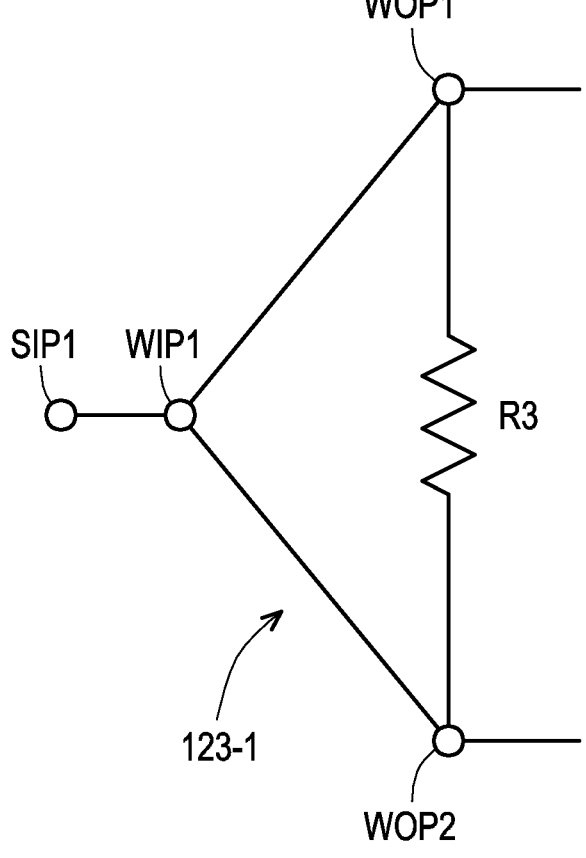
FIG. 2D is a schematic diagram of a power divider according to an embodiment of the present invention.

FIG. 2D is a schematic diagram of a power divider according to an embodiment of the present invention. Referring to FIG. 2A to FIG. 2D, the power divider 123 includes an input port WIP1 and two output ports WOP1, WOP2. The input port WIP1 of the power divider 123 is coupled to the input port SIP1, and the two output ports WOP1 and WOP2 are coupled to the input port CIP1 of the switching circuit 121 and the input port CIP2 of the switching circuit 122 respectively. Among them, the switching circuits 121 and 122 are coupled to the input port SIP1 of the selection circuit 12 through the power divider 123.

In an embodiment, the power divider 123 is a Wilkinson power divider 123-1. The two output ports WOP1 and WOP2 of The Wilkinson power divider 123-1 have the same impedance. For example, the impedance value is 50 ohms (Ω), but is not limited thereto. In an embodiment, the impedance elements R11, R21 match the two output ports WOP1 and WOP2 of the power divider 123.

In an embodiment, the impedance elements R11, R12, R21, R22 and the two output ports WOP1, WOP2 has the same impedance value, and accordingly match the impedance of the two input ports DIP11, DIP12 of the branch line coupler 11. For example, the impedance value is 50 ohms, but is not limited thereto.

In an embodiment, the power divider 123 includes an impedance element R3 coupling between the two output ports WOP1 and WOP. Taking the Wilkinson power divider 123-1 as an example, the impedance element R3 has another impedance value, and this other impedance value is twice the impedance value of the impedance elements R11, R12, R21, R22. For example, the impedance elements R11, R12, R21, R22 have an impedance value of 50 ohms, and the impedance element R3 has an impedance value of 100 ohms.

However, in other embodiments, the impedance values of the impedance elements R11, R12, R21, R22, R3 can still be adjusted according to actual needs.

Referring to FIG. 1, the controller 13 is coupled to the selection circuit 12 of the beam switching system 10. The controller 13 can be a chip, processor, microcontroller, Field Programmable Gate Array (FPGA), Application-Specific Integrated Circuit (ASIC), or any type of control circuit. In an embodiment, the controller 13 is used to generate a control signal CS and transmit the control signal CS to the selection circuit 12.

Referring to FIG. 1 and FIG. 2A, the two antennas 20, 25 are respectively coupled to the output ports DOP11, DOP12 of the branch line coupler 11. In an embodiment, the two antennas 20, 25 are used to transmit radio frequency signals output by the branch line coupler 11.

In the following, the operation will be explained with each component in the antenna apparatus 1. Each process can be adjusted according to the implementation situation, and is not limited thereto.

In an embodiment, in the first mode, the selection circuit 12 turns on the signal path of the input port SIP1 and one of the output ports SOP11, SOP12, turns off another signal path of the input port SIP1 and another one of the output ports SOP11, SOP12.

Figure 3A:
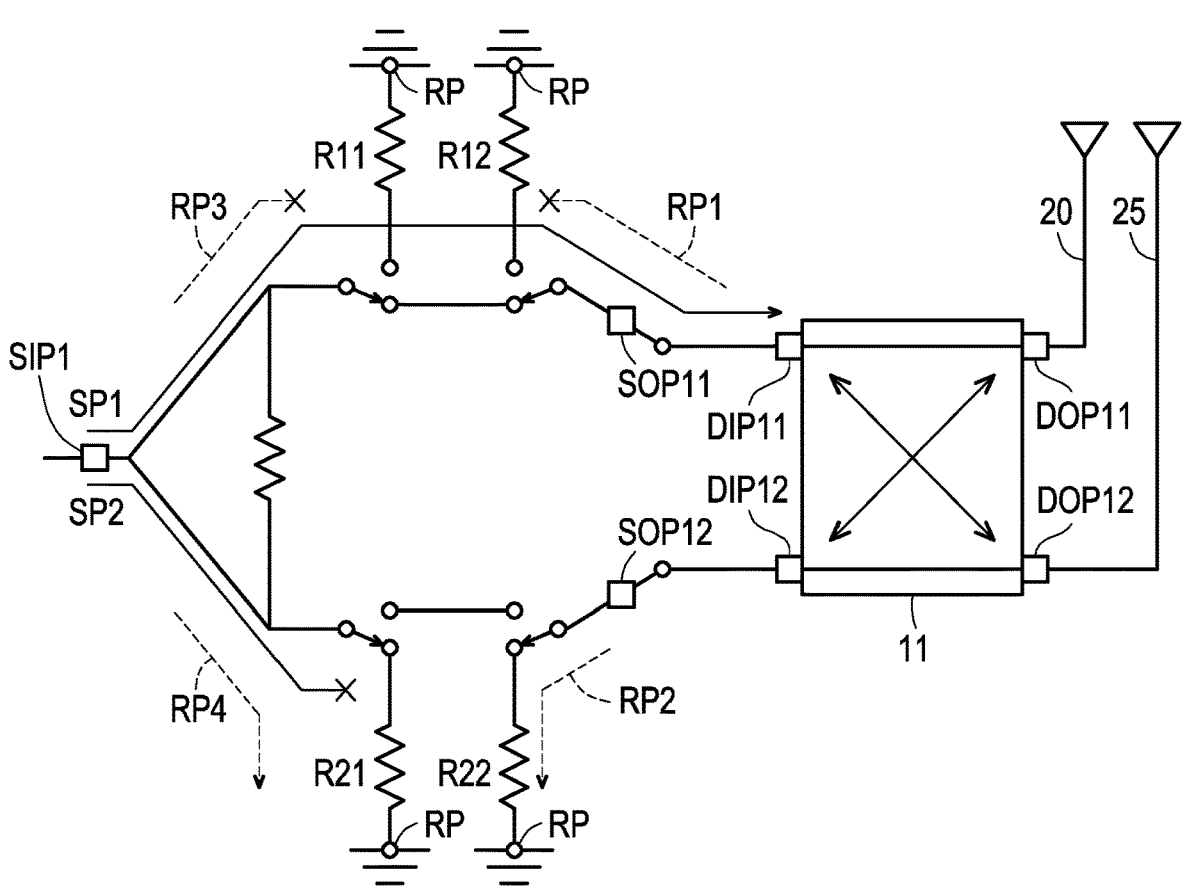
FIG. 3A is a schematic diagram of a signal path in the first mode according to an embodiment of the present invention.

For example, FIG. 3A is a schematic diagram of a signal path in the first mode according to an embodiment of the present invention. Referring to FIG. 3A, the selection circuit 12 turns on a signal path SP1 of the input port SIP1 and the output port SOP11. Taking FIG. 2B as an example, the switch 121-1 turns on the input port SI11 and the output port SO12 and turns off the input port SI11 and the output port SO1, and the switch 121-2 turns on the input port SI22 and the output port SO21 and turns off the input port SI21 and the output port SO21. Besides, the selection circuit 12 turns off the signal path SP2 of the input port SIP1 and the output port SOP12. Taking FIG. 2C as an example, the switch 122-1 turns on the input port SI31 and the output port SO32 and turns off the input port SI31 and the output port SO31, and the switch 122-2 turns on the input port SI42 and the output port SO41 and turns off the input port SI41 and the output port SO41. Therefore, the input radio frequency signal IRF1 shown in FIG. 1 is input to the input port SIP1 and passes through the signal path SP1, so that the output radio frequency signal ORF1 shown in FIG. 1 is output from the output port SOP11 to the input port DIP11 of the branch line coupler 11. However, the output radio frequency signal ORF1 is not output from the output port SOP12 to the input port DIP12 of the branch line coupler 11.

Figure 3B:
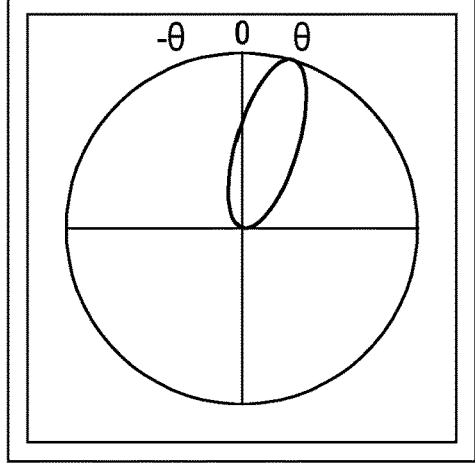
FIG. 3B is a schematic diagram of the radiation field pattern corresponding to FIG. 3A.

FIG. 3B is a schematic diagram of the radiation field pattern corresponding to FIG. 3A. Referring to FIG. 3A and FIG. 3B, in the first mode, the branch line coupler 11 can be configured as a shifter providing a fixed phase difference. For example, the signal path SP1 of FIG. 3A is only turned on but the signal path SP2 of FIG. 3A is turned off. The phase difference of the radio frequency signal output by the two output ports DOP11 and DOP12 of the branch line coupler 11 is, for example, 35°, 45° or 90°, but is not limited thereto. At this time, the radiation pattern of the two antennas 20, 25 corresponds to the reference direction toward θ degrees (for example, the main beam is toward θ degrees). θ is, for example, 15, 20 or 45, but is not limited thereto.

Figure 4A:
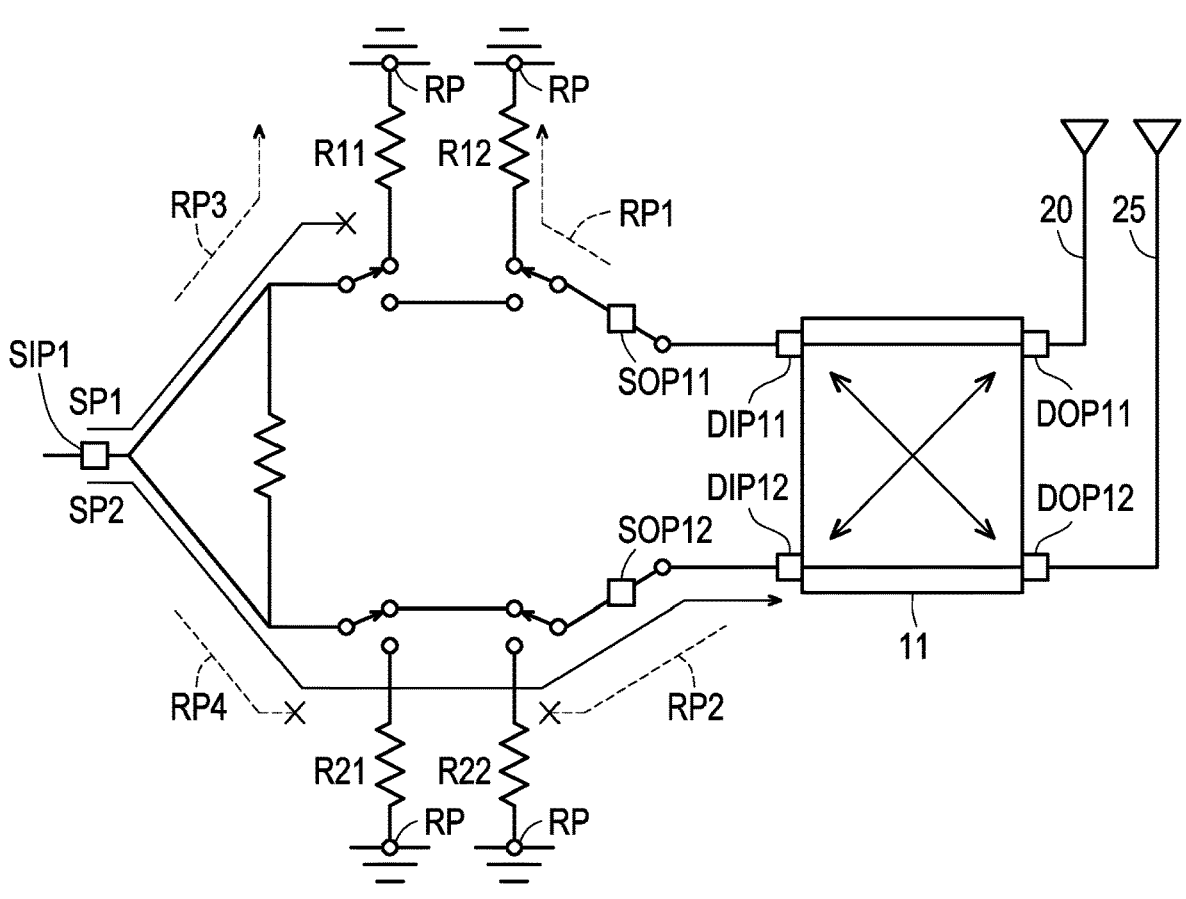
FIG. 4A is a schematic diagram of a signal path in the third mode according to another embodiment of the present invention.

For example, FIG. 4A is a schematic diagram of a signal path in a third mode according to another embodiment of the present invention. Referring to FIG. 4A, the on/off relationship of the signal path SP1 and SP2 of the third mode is opposite to that of the first mode, but the principle is similar. The selection circuit 12 turns off the signal path SP1 of the input port SIP1 and the output port SOP11. The circuit details of FIG. 4A refer to FIG. 2B and FIG. 2C, but the on/off relationship is reversed. The switch 121-1 turns on the input port SI11 and the output port SO11 and turns off the input port SI11 and the output port SO12, and the switch 121-2 turns on the input port SI21 and the output port SO21 and turns off the input port SI22 and the output port SO21. In addition, the selection circuit 12 turns on the signal path SP2 of the input port SIP1 and the output port SOP12. The switch 122-1 turns on the input port SI31 and the output port SO31 and turns off the input port SI31 and the output port SO32, and the switch 122-2 turns on the input port SI41 and the output port SO41 and turns off the input port SI42 and the output port SO41. Therefore, the input radio frequency signal IRF1 shown in FIG. 1 is input to the input port SIP1 and passes through the signal path SP2, so that the output radio frequency signal ORF1 shown in FIG. 1 is output from the output port SOP12 to the input port DIP12 of the branch line coupler 11. However, the output radio frequency signal ORF1 is not output from the output port SOP11 to the input port DIP11 of the branch line coupler 11.

Figure 4B:
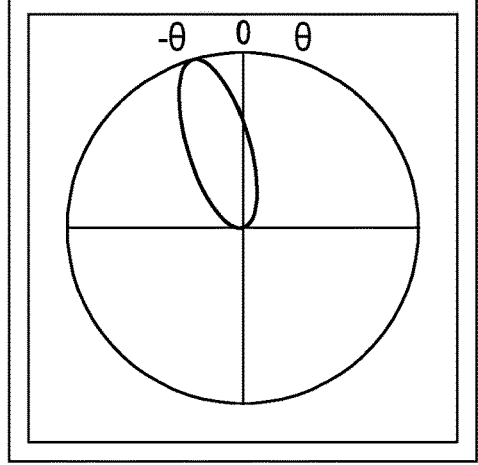
FIG. 4B is a schematic diagram of the radiation field pattern corresponding to FIG. 4A.

FIG. 4B is a schematic diagram of the radiation field pattern corresponding to FIG. 4A. Referring to FIG. 4A and FIG. 4B, in the third mode, the branch line coupler 11 can be configured as a shifter providing a fixed phase difference. For example, the signal path SP2 of FIG. 4A is only turned on but the signal path SP1 of FIG. 4A is turned off. The phase difference of the radio frequency signal output by the two output ports DOP11 and DOP12 of the branch line coupler 11 is, for example, 35°, 45° or 90°, but is not limited thereto. At this time, the radiation pattern of the two antennas 20, 25 corresponds to the reference direction toward −θ degrees (for example, the main beam is toward −θ degrees). −θ is, for example, 15, 20 or 45, but is not limited thereto. Since the signal paths SP1 and SP2 may have similar electrical characteristics, such as the same length of conduction distance and/or the same impedance, the radiation field patterns of the two antennas 20 and 25 in the first mode and the third mode may be in opposite phases, for example, they are the reference directions toward θ degrees and toward −θ degrees respectively.

In an embodiment, in the first mode and the third mode, the selection circuit 12 turns off the impedance path of the reference potential port RP and one of the output ports SOP11, SOP12, and turns on another impedance path of the reference potential port RP and another one or the output ports SOP11, SOP12. In an embodiment, in the first mode and the third mode, the selection circuit 12 turns on the impedance path of the reference potential port RP and one of the two output ports WOP1, WOP2 of the power divider 123, and turns off another impedance path of the reference potential port RP and another one of the two output ports WOP1, WOP2 of the power divider 123.

Taking FIG. 3A as an example, in the first mode, the selection circuit 12 turns off the impedance path RP1 of the reference potential port RP and the output port SOP11, and turns on the impedance path RP2 of the reference potential port RP and the output port SOP12 (turn off the signal path SP2). In addition, the selection circuit 12 turns on the impedance path RP4 of the output port WOP2 of the power divider 123 and the reference potential port RP (turn off the signal path SP2), and turns off another impedance path RP3 of the output port WOP1 of the power divider 123 and the reference potential port RP (turn on the signal path SP1).

Referring to FIG. 3A, FIG. 2B and FIG. 2D at the same time, for the impedance path RP1, the switch 121-2 turns on the input port SI22 and the output port SO21 and turns off the input port SI21 and the output port SO21 to cut off the impedance path RP1. For the impedance path RP3, the switch 121-1 turns on the input port SI11 and the output port SO12 and turns off the input port SI11 and the output port SO11, so that the impedance path RP3 of the output port WOP1 and the reference potential port RP shown in FIG. 2D is cut off.

Referring to FIG. 3A, FIG. 2C and FIG. 2D at the same time, for the impedance path RP2, the switch 122-2 turns on the input port SI42 and the output port SO41 and turns off the input port SI41 and the output port SO41 to conduct the impedance path RP2. For the impedance path PR4, the switch 122-1 turns on the input port SI31 and the output port SO32 and turns off the input port SI31 and the output port SO31, so that the impedance path RP4 of the output port WOP2 and the reference potential port RP shown in FIG. 2D is conducted. In an embodiment, since the impedance elements R11, R12, R21, R22 and the two output ports WOP1, WOP2 have the same impedance value, the impedance of the output ports SOP11, SOP12 can be matched to the impedance of the two output ports DOP11, DOP12 of the branch line coupler 11. In this way, the two antennas 20, 25 can generate a predetermined radiation field pattern (for example, the main beam is oriented toward θ degrees).

Besides, taking FIG. 4A as an example, in the third mode, the selection circuit 12 turns off the impedance path RP2 of the reference potential port RP and the output port SOP12 (turn on the signal path SP2), and turns on the impedance path RP1 of the reference potential port RP and the output port SOP11. The selection circuit 12 turns on the impedance path RP3 of the output port WOP1 of the power divider 123 and the reference potential port RP (turn off the signal path SP1), turns off another impedance path RP4 of the output port WOP2 of the power divider 123 and the reference potential port RP (turn on the signal path SP2).

Referring to FIG. 4A, FIG. 2B and FIG. 2D at the same time (please note that the on/off relationship of FIG. 2B is opposite to that shown in FIG. 4A), for the impedance path RP1, the switch 121-2 turns off the input port SI22 and the output port SO21 and turns on the input port SI21 and the output port SO21 to conduct the impedance path RP1. For the impedance path RP3, the switch 121-1 turns off the input port SI11 and the output port SO12 and turns on the input port SI11 and the output port SO11, so that the impedance path RP3 of the output port WOP1 and the reference potential port RP shown in FIG. 2D is conducted.

Referring to FIG. 4A, FIG. 2C and FIG. 2D at the same time (please note that the on/off relationship of FIG. 2C is opposite to that shown in FIG. 4A), for the impedance path RP2, the switch 122-2 turns off the input port SI42 and the output port SO41 and turns on the input port SI41 and the output port SO41 to cut off the impedance path RP2. For the impedance path RP4, the switch 122-1 turns off the input port SI31 and the output port SO32 and turns on the input port SI31 and the output port SO31, so that the impedance path RP4 of the output port WOP2 and the reference potential port RP shown in FIG. 2D is cut off. In an embodiment, since the impedance elements R11, R12, R21, R22 and the two output ports WOP1, WOP2 have the same impedance value, the impedance of the output ports SOP11, SOP12 can be matched to the impedance of the two output ports DOP11, DOP12 of the branch line coupler 11. In this way, the two antennas 20, 25 in the third mode can generate a predetermined radiation field pattern that is opposite to that in the first mode (for example, the main beam is oriented towards −θ degrees).

In an embodiment, in the second mode, the selection circuit 12 turns on the two signal paths of the input port SIP1 and the output ports SOP11, SOP12.

Figure 5A:
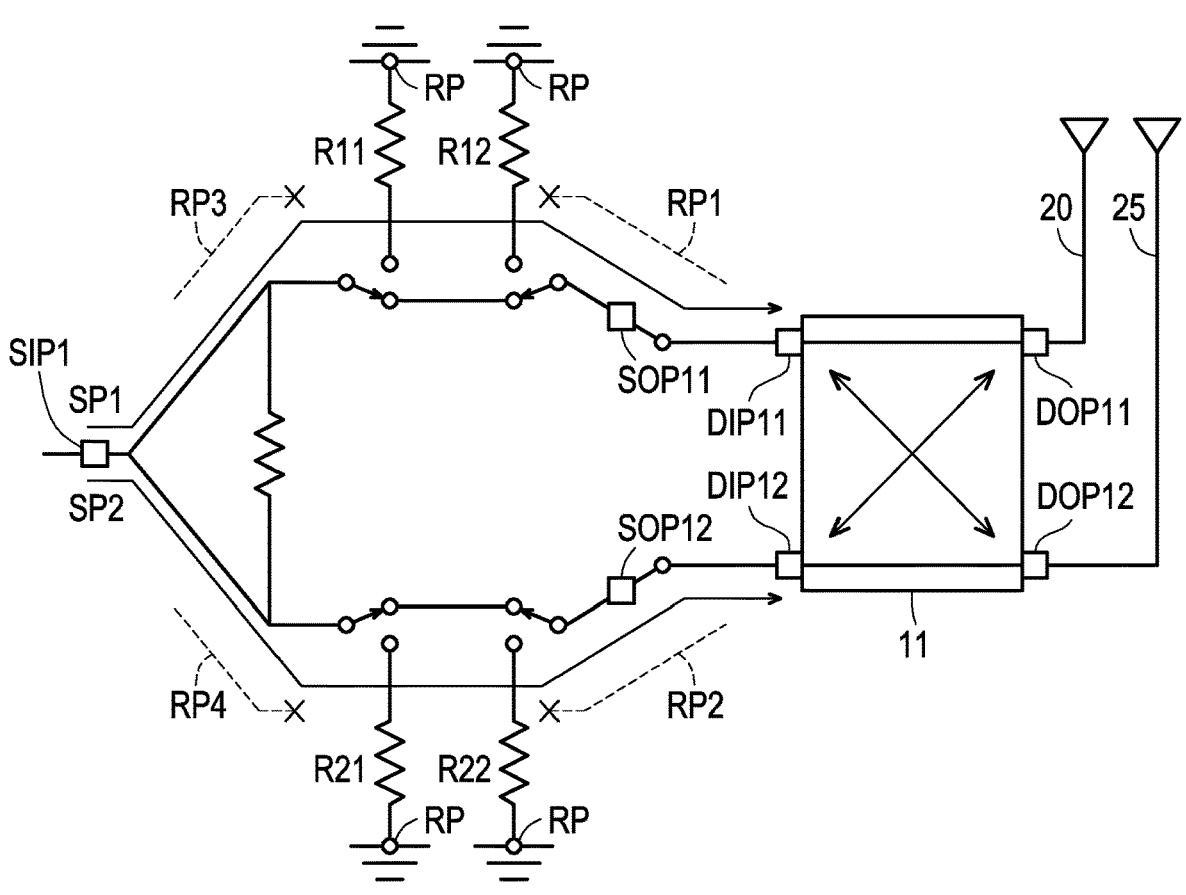
FIG. 5A is a schematic diagram of a signal path in the second mode according to an embodiment of the present invention.

For example, FIG. 5A is a schematic diagram of a signal path in the second mode according to an embodiment of the present invention. Referring to FIG. 5A, the selection circuit 12 turns on the signal path SP1 of the input port SIP1 and the output port SOP11. Referring to FIG. 2B at the same time, the switch 121-1 turns on the input port SI11 and the output port SO12a and turns off the input port SI11 and the output port SO11, and the switch 121-2 turns on the input port SI22 and the output port SO21 and turns off the input port SI21 and the output port SO21. In addition, the signal path SP2 of the input port SIP1 and the output port SOP12 is turned on. Referring to FIG. 2C at the same time (please note that the on/off relationship of FIG. 2C is opposite to that shown in FIG. 5A), the switch 122-1 turns on the input port SI31 and the output port SO31 and turns off the input port SI31 and the output port SO32, and the switch 122-2 turns on the input port SI41 and the output port SO41 and turns off the input port SI42 and the output port SO41. Therefore, the input radio frequency signal IRF1 shown in FIG. 1 is input to the input port SIP1 and passes through the signal paths SP1, SP2 at the same time, so that the output radio frequency signal ORF1 shown in FIG. 1 is output from the output ports SOP11 and SOP12 to the input ports DIP11 and DIP12 of the branch line coupler 11 simultaneously and respectively.

Figure 5B:
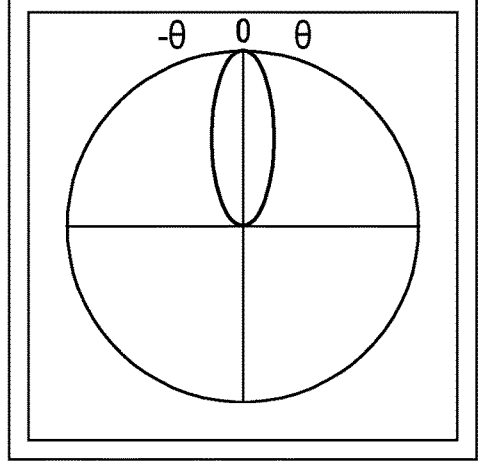
FIG. 5B is a schematic diagram of the radiation field pattern corresponding to FIG. 5A.

FIG. 5B is a schematic diagram of the radiation field pattern corresponding to FIG. 5A. Referring to FIG. 5A and FIG. 5B, in the second mode, the signal path SP1, SP2 of FIG. 5A is, for example, turned on at the same time. Since the signal paths SP1 and SP2 may have similar electrical characteristics, such as the same length of conduction distance and/or the same impedance, the phase difference of the radio frequency signals output by the two output ports DOP11, DOP12 of the branch line coupler 11 is, for example, 0 (that is, the same phase). At this time, the radiation field pattern of the two antennas 20, 25 corresponds to the reference direction toward 0 degrees (for example, the main beam is toward 0 degrees).

In an embodiment, in the second mode, the selection circuit 12 cuts off the impedance paths of the reference potential port RP and the two output ports SOP11, SOP12. In an embodiment, in the second mode, the selection circuit 12 cuts off the impedance paths of the reference potential port RP and the two output ports WOP1, WOP2 of the power divider 123.

Taking FIG. 5A as an example, the selection circuit 12 turns off the impedance path RP1 of the reference potential port RP and the output port SOP11 (turns on the signal path SP1), and turns off the impedance path RP2 of the reference potential port RP and the output port SOP12 (turns on the signal path SP2). Referring to FIG. 2D and FIG. 5A, the selection circuit 12 turns off the impedance paths RP3, RP4 of the reference potential port RP and the two output ports WOP1, WOP2 of the power divider 123. Therefore, the signal path SP1, SP2 is conducted.

Referring to FIG. 5A, FIG. 2B and FIG. 2D at the same time, for the impedance path RP1, the switch 121-2 turns on the input port SI22 and the output port SO21 and turns off the input port SI21 and the output port SO21 to cut off the impedance path RP1. For the impedance path RP3, the switch 121-1 turns on the input port SI11 and the output port SO12 and turns off the input port SI11 and the output port SO11 to cut off the impedance path RP3 of the output port WOP1 of the power divider 123 and the reference potential port RP.

Referring to FIG. 5A, FIG. 2C and FIG. 2D at the same time (please note that the on/off relationship of FIG. 2C is opposite to that shown in FIG. 5A), for the impedance path RP2, the switch 122-2 turns off the input port SI42 and the output port SO41 and turns on the input port SI41 and the output port SO41 to cut off the impedance path RP2. For the impedance path RP4, the switch 122-1 turns off the input port SI31 and the output port SO32 and turns on the input port SI31 and the output port SO31 to cut off the impedance path RP4 of the output port WOP2 of the power divider 123 and the reference potential port RP. In an embodiment, since the two output ports WOP1, WOP2 have the same impedance value, the impedance of the output ports SOP11, SOP12 can match the impedance of the two output ports DOP11, DOP12 of the branch line coupler 11.

As can be seen from FIG. 3B, FIG. 4B and FIG. 5B, corresponding to the first mode, the third mode and the second mode, the two antennas 20, 25 can form beam field patterns corresponding to three reference directions of θ degrees, −θ degrees and 0 degrees. The controller 13 generate the control signal C according to a beam direction. The beam direction is the beam field pattern (main direction) formed by the two antennas 20, 25. For example, the beam direction corresponds to θ degrees, to a reference direction of −θ degrees, or to a reference direction of 0 degrees. And the controller 13 can generate the control signal CS corresponding to three reference directions of θ degree, −θ degree and/or 0 degree in three modes respectively. Taking a digital signal as an example, "00" corresponds to the reference direction of 0 degrees, "01" corresponds to the reference direction of θ degrees, and "10" corresponds to the reference direction of −θ degrees. However, the content of the control signal CS can still be changed according to actual needs. For example, three potentials in analog form correspond to three reference directions.

In an embodiment, the controller 13 can select one of three reference directions corresponding to θ degrees, −θ degrees and/or 0 degrees as the beam direction. For example, select θ degrees as the beam direction, −θ degrees as the beam direction, or 0 degrees as the beam direction.

In addition, it can be seen from FIG. 3A, FIG. 4A, FIG. 5A, FIG. 3B, FIG. 4B and FIG. 5B that by turning on or off the signal paths SP1, SP2 shown in FIG. 3A, FIG. 4A or FIG. 5A, the two antennas 20, 25 can form beam field patterns corresponding to the three reference directions of θ degrees, −θ degrees and 0 degrees. The selection circuit 12 selects at least one of the output ports SOP11, SOP12 according to the control signal CS to output the output radio frequency signal ORF1.

Taking FIG. 3A and FIG. 3B as an example, the selection circuit 12 selects the output port SOP11 to output the output radio frequency signal ORF1 based on the control signal CS corresponding to the reference direction of θ degrees. That is to say, corresponding to the reference direction of θ degrees, the selection circuit 12 selects the output port SOP11 to output the output radio frequency signal ORF1.

Taking FIG. 4A and FIG. 4B as an example, the selection circuit 12 selects the output port SOP12 to output the output radio frequency signal ORF1 based on the control signal CS corresponding to the reference direction of −θ degrees. That is to say, corresponding to the reference direction of −θ degrees, the selection circuit 12 selects the output port SOP11 to output the output radio frequency signal ORF1.

Taking FIG. 5A and FIG. 5B as an example, the selection circuit 12 selects the output ports SOP11 and SOP12 to output the output radio frequency signal ORF1 based on the control signal CS corresponding to the reference direction of 0 degrees. That is to say, corresponding to the reference direction of 0 degrees, the selection circuit 12 selects the output ports SOP11, SOP12 to output the output radio frequency signal ORF1.

Figure 6:
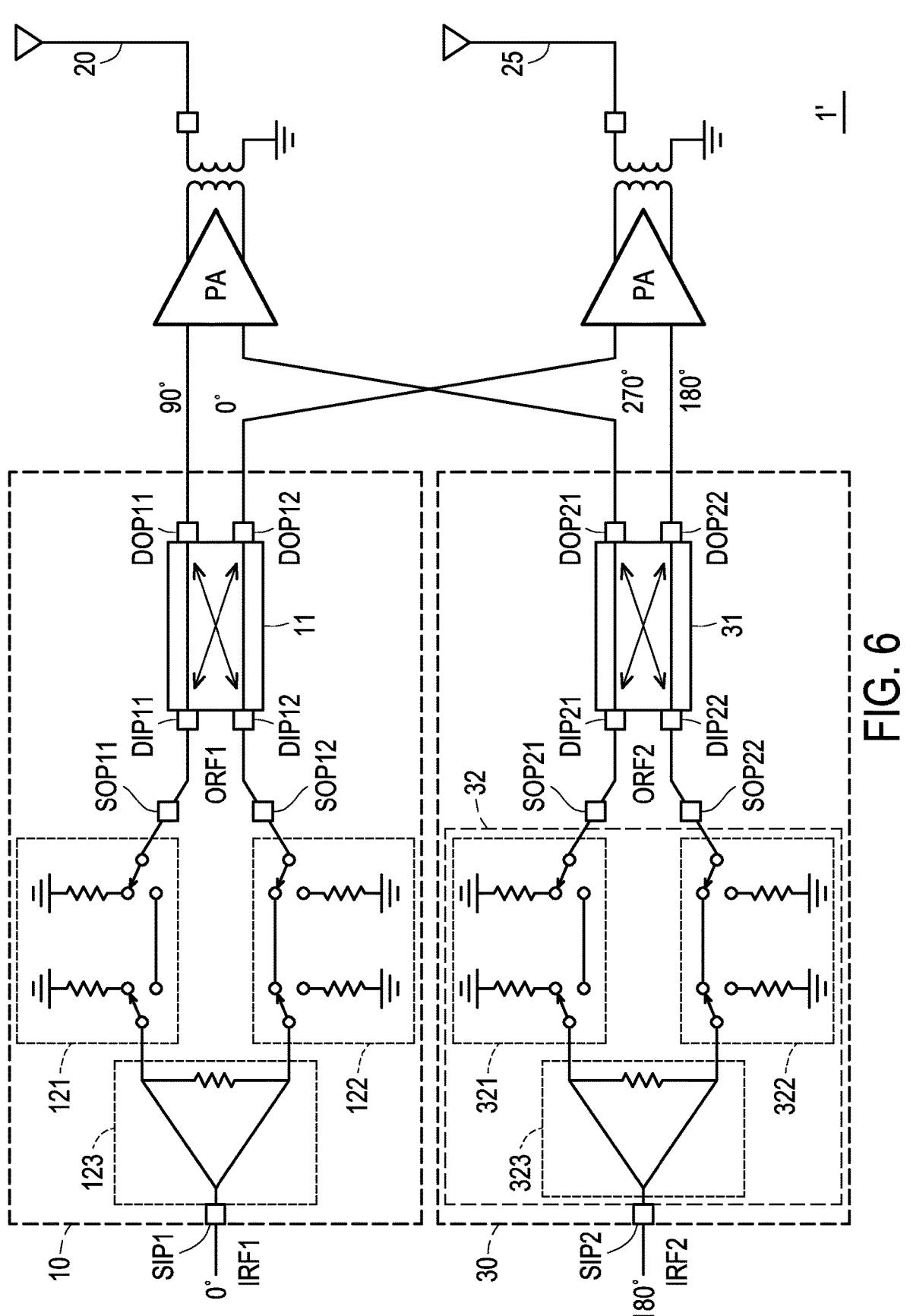
FIG. 6 is a schematic diagram of an antenna apparatus according to another embodiment of the present invention.

FIG. 6 is a schematic diagram of an antenna apparatus 1' according to another embodiment of the present invention. Referring to FIG. 6, the difference from the antenna apparatus 1 of FIG. 1 is that the antenna apparatus 1' further includes a beam switching system 30 and two amplifiers PA.

The beam switching system 30 includes a branch line coupler 31 and a selection circuit 32.

The branch line coupler 31 includes two input ports DIP21, DIP22 and two output ports DOP21, DOP22.

The two input ports DIP21, DIP22 are coupled to the selection circuit 32. The two input ports DIP21, DIP22 are used to receive an output radio frequency signal ORF2 from the selection circuit 32.

The two output ports DOP21, DOP22 are used to couple the two antennas 20, 25 respectively. In the embodiment, the two amplifiers PA are coupled to the two antennas 20, 25.

In an embodiment, the branch line coupler 31 forms a phase difference between the two output ports DOP21 and DOP22 in the first mode and the third mode. The phase difference is, for example, the difference between 270° and 180° (i.e., 90°) shown in the figure, but is not limited thereto. Taking the phase difference of 90° as an example, one of the two input ports DIP21 and DIP22 inputs the output radio frequency signal ORF2, and the two output ports DOP21 and DOP22 output signals with a phase difference of 90°.

In an embodiment, the branch line coupler 31 in the second mode has the same phase as the two output ports DOP21, DOP22. The two input ports DIP21 and DIP22 simultaneously input the output radio frequency signal ORF2, and the two output ports DOP21 and DOP22 output signals with a phase difference of 0° (that is, have the same phase).

In an embodiment, there is a phase difference between the output port DOP11 of the branch line coupler 11 and the output port DOP21 of the branch line coupler 31. The phase difference is, for example, the difference between 90° and 270° as shown in the figure (i.e., 180°). However, the phase difference between the output port DOP11 and the output port DOP21 can still be changed according to actual needs.

In an embodiment, there is a phase difference between the output port DOP12 of the branch line coupler 11 and the output port DOP22 of the branch line coupler 31. The phase difference is, for example, the difference between 0° and 180° as shown in the figure (i.e., 180°). However, the phase difference between the output port DOP12 and the output port DOP22 can still be changed according to actual needs.

The selection circuit 32 includes an input port SIP2 and output ports SOP21, SOP22.

The input port SIP2 is used to receive an input radio frequency signal IRF2. In an embodiment, there is a phase difference between the input radio frequency signal IRF2 and the input radio frequency signal IRF1. The phase difference is, for example, 180°. That is, the input radio frequency signal IRF2 is the inverted signal of the input radio frequency signal IRF1. However, the phase difference between the input radio frequency signal IRF2 and the input radio frequency signal IRF1 can still be changed according to actual needs.

In an embodiment, the phase difference between the input radio frequency signal IRF2 and the input radio frequency signal IRF1 is the same as the phase difference between the output port DOP11 and the output port DOP21 and/or the phase difference between the output port DOP12 and the output port DOP22. The phase difference is, for example, 180°, but is not limited thereto.

The output ports SOP21, SOP22 are respectively coupled to the two input ports DIP21, DIP22 of the branch line coupler 31.

The selection circuit 32 selects at least one of the output ports SOP21, SOP22 (such as, selecting the output port SOP21, selecting the output port SOP22 or selecting the output ports SOP21, SOP22) to output the output radio frequency signal ORF2.

In an embodiment, the selection circuit 32 includes switching circuits 321, 322. The detailed circuit structure and functional operation of the switching circuits 321, 322 can be referred to the aforementioned description of the switching circuits 121, 122, and will not be described again here.

In an embodiment, in the first mode, the selection circuit 12 turns on the signal path of the input port SIP1 and the output port SOP11 (the signal path SP1 shown in FIG. 3A) and turns off the signal path of the input port SIP1 and the output port SOP12 (the signal path SP2 shown in FIG. 3A), and the selection circuit 32 turns on the signal path of the input port SIP2 and the output port SOP21 (the signal path SP1 shown in FIG. 3A) and turns off the signal path of the input port SIP2 and the output port SOP22 (the signal path SP2 shown in FIG. 3A). At this time, the beam directions of the antennas 20, 25 correspond to the reference direction of θ degrees shown in FIG. 3B.

In an embodiment, in the third mode, the selection circuit 12 turns on the signal path of the input port SIP1 and the output port SOP12 (the signal path SP2 shown in FIG. 4A) and turns off the signal path of the input port SIP1 and the output port SOP11 (the signal path SP1 shown in FIG. 4A), and the selection circuit 32 turns on the signal path of the input port SIP2 and the output port SOP22 (the signal path SP2 shown in FIG. 4A) and turns off the signal path of the input port SIP2 and the output port SOP21 (the signal path SP1 shown in FIG. 4A). At this time, the beam directions of the antennas 20, 25 correspond to the reference direction of −θ degrees shown in FIG. 4B.

In an embodiment, in the second mode, the selection circuit 12 turns on the signal path of the input port SIP1 and the output port SOP11 (the signal path SP1 shown in FIG. 5A) and turns on the signal path of the input port SIP1 and the output port SOP12 (the signal path SP2 shown in FIG. 5A), and the selection circuit 32 turns on the signal path of the input port SIP2 and the output port SOP21 (the signal path SP1 shown in FIG. 5A) and turns on the signal path of the input port SIP2 and the output port SOP22 (the signal path SP2 shown in FIG. 5A). At this time, the beam directions of the antennas 20, 25 correspond to the reference direction of 0 degrees shown in FIG. 5B.

In an embodiment, the selection circuit 32 includes a power divider 323. The detailed circuit structure and functional operation of the power divider 323 can be referred to the aforementioned description of the power divider 123, and will not be described again here.

Each amplifier PA is coupled to the two branch line couplers 11, 31, and coupled to one of the two antennas 20, 25. The amplifiers PA are used to adjust the voltage/current gain of the branch line coupler 11, 31. For example, amplify the voltage amplitude of the radio frequency signal output by the branch line coupler 11, 31.

Figure 7:
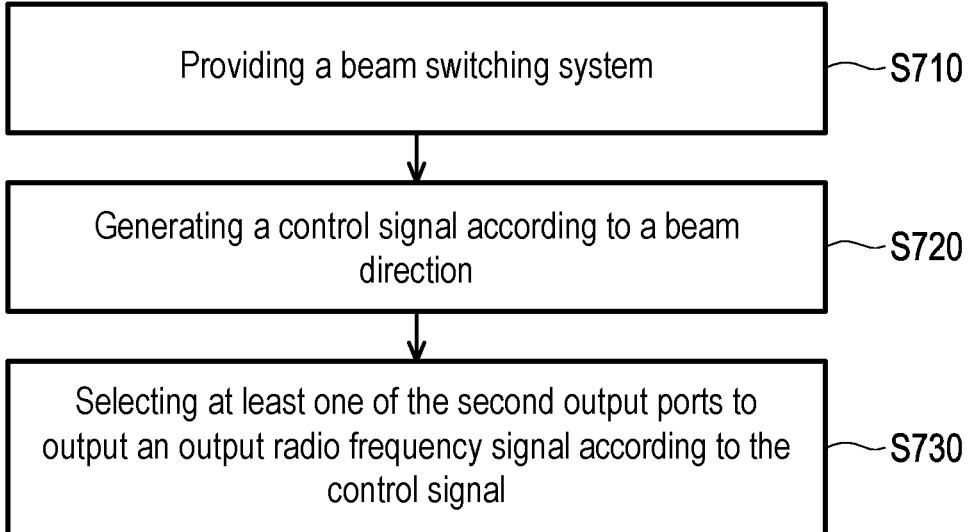
FIG. 7 is a flow chart of a beam switching method according to an embodiment of the present invention.

FIG. 7 is a flow chart of a beam switching method according to an embodiment of the present invention. Referring to FIG. 7, a beam switching system is provided (step S710). For example, the beam switching system 10 of FIG. 1, FIG. 2A or FIG. 6 and/or the beam switching system 30 of FIG. 6. A control signal is generated according to the beam direction (step S720). The beam direction is, for example, the reference direction corresponding to θ degrees, −θ degrees, or 0 degrees. At least one of the two output ports of the selection circuit is selected according to the control signal to output an output radio frequency signal (step S730). For example, the control signal CS is used to select one or both of the two output ports SOP11 and SOP12 of the selection circuit 12 shown in FIG. 1 or FIG. 6 to output the output radio frequency signal ORF1, and/or to select one or both of the two output ports SOP21, SOP22 of the selection circuit 32 shown in FIG. 6.

In an embodiment, in the first mode, corresponding to a reference direction, one of the two output ports of the selection circuit is selected to output the output radio frequency signal; or in the third mode, corresponding to another reference direction, another one of the two output ports of the selection circuit is selected to output the output radio frequency signal; or in the second mode, corresponding to yet another reference direction, the two output ports of the selection circuit are selected to output the output radio frequency signal. Taking FIG. 3A and FIG. 3B as an example, the output port SOP11 of the selection circuit 12 outputs the output radio frequency signal ORF1 and corresponds to the reference direction of θ degrees; or taking FIG. 4A and FIG. 4B as an example, the output port SOP12 of the selection circuit 12 outputs the output radio frequency signal ORF1 and corresponds to the reference direction of −θ degrees; taking FIG. 5A and FIG. 5B as an example, the output ports SOP11, SOP12 of the selection circuit 12 output the output radio frequency signal ORF1, and correspond to the reference direction of 0 degrees.

In an embodiment, one of three reference directions is selected as the beam direction, where the three reference directions are θ degrees, −θ degrees and 0 degrees respectively.

The implementation details of each step in FIG. 7 have been described in detail in the foregoing embodiments and implementation modes, and will not be described again here. In addition to being implemented in the form of circuits, each step and implementation details of the embodiments of the present invention can also be implemented by the processor in the form of software, and the embodiments of the present invention are not limited thereto.

In summary, in the beam switching system, the beam switching method, and the antenna apparatus of the embodiment of the present invention, the dual antenna apparatus provides the selection circuit and the branch line coupler. In addition, the radio frequency signal is output through at least one of the two output ports of the selection circuit, so that the two output ports of the branch line coupler form three different phase differences, and the two antennas form corresponding three different radiation field patterns (corresponding to one reference direction respectively). In this way, the use of phase shifters can be reduced and a simpler circuit structure can be provided.

Although the present application has been disclosed as above with embodiments, it is not intended to limit the present application. Any person with ordinary knowledge in the art, without departing from the spirit and scope of the present application, can make some changes. Therefore, the protection scope of the present application shall be determined by the scope of the claims.

What is claimed is:

1. A beam switching system, comprising:
a selection circuit selectively coupled to a reference potential port, comprising:
    a first input port, receiving an input radio frequency signal;
    two first output ports;
    a first switching circuit, its input port is coupled to the first input port, its output port is coupled to one of the first output ports, and its two reference ports are respectively coupled to the reference potential port; and
    a second switching circuit, its input port is coupled to the first input port, its output port is coupled to the other one of the first output ports, and its two reference ports are respectively coupled to the reference potential port, wherein the second switching circuit comprises:
    a first switch, its input port is coupled to the first input port, and one of its two output ports is coupled to one of the two reference ports of the second switching circuit; and
    a second switch, its two input ports are respectively coupled to the other one of the two output ports of the first switch and the other one of the two reference ports of the second switching circuit, and its output port is coupled to the other one of the first output ports,
    wherein the selection circuit selects at least one of the two first output ports to output an output radio frequency signal; and
    a branch line coupler, comprising:
    two second input ports, respectively coupled to the two first output ports of the selection circuit and used to receive the output radio frequency signal; and
    two second output ports, respectively used to couple two antennas.

2. The beam switching system according to claim 1, wherein the selection circuit is used to:
in a first mode, turn on a first signal path of the first input port and one of the two first output ports, and turn off a second signal path of the first input port and the other one of the two first output ports; and
in a second mode, turn on the first signal path and the second signal path.

3. The beam switching system according to claim 2, wherein the selection circuit is further used to:
in the first mode, turn off a first impedance path of the reference potential port and one of the two first output ports, and turn on a second impedance path of the reference potential port and the other one of the two first output ports; and
in the second mode, turn off the first impedance path and the second impedance path.

4. The beam switching system according to claim 1, wherein the first switching circuit comprises:
a third switch, its input port is coupled to the first input port, and one of its two output ports is coupled to one of the two reference ports of the first switching circuit; and a fourth switch, its two input ports are respectively coupled to the other one of the two output ports of the third switch and the other one of the two reference ports of the first switching circuit, and its output port is coupled to the one of the first output ports.

5. The beam switching system according to claim 4, wherein the first switching circuit further comprises:
a first impedance element, one of the output ports of the third switch is coupled to the reference potential port via the first impedance element; and
a second impedance element, the output port of the fourth switch is coupled to the reference potential port via the second impedance element.

6. The beam switching system according to claim 5, wherein the second switching circuit further comprises:
a third impedance element, one of the output ports of the first switch is coupled to the reference potential port via the third impedance element; and
a fourth impedance element, the output port of the second switch is coupled to the reference potential port via the fourth impedance element.

7. The beam switching system according to claim 6, wherein the first impedance element to the fourth impedance element have the same first impedance value.

8. The beam switching system according to claim 7, wherein the selection circuit further comprises:
a power divider, its input port is coupled to the first input port, and its two output ports are respectively coupled to the input ports of the first switching circuit and the second switching circuit, its fifth impedance element coupling between the two output ports has a second impedance value, and the second impedance value is twice the first impedance value.

9. The beam switching system according to claim 1, wherein the selection circuit further comprises:
a power divider, its input port is coupled to the first input port, and its two output ports are respectively coupled to the input ports of the first switching circuit and the second switching circuit.

10. The beam switching system according to claim 9, wherein the selection circuit is further used to:
in a first mode, turn on a third impedance path of the reference potential port and one of the two output ports of the power divider, and turn off a fourth impedance path of the reference potential port and the other one of the two output ports of the power divider; and in a second mode, turn off the third impedance path and the fourth impedance path.

11. The beam switching system according to claim 9, wherein the power divider is a Wilkinson power divider, wherein two output ports of the Wilkinson power divider have the same impedance.

12. The beam switching system according to claim 1, wherein the branch line coupler has a phase difference between signals at the two second output ports in a first mode, and has the same phase between signals at the two second output ports in a second mode.

13. The beam switching system according to claim 1, further comprises:
a second selection circuit, comprising:
    a third input port, used to receive a second input radio frequency signal, wherein there is a second phase difference between the input radio frequency signal and the second input radio frequency signal; and
    two third output ports,
    wherein the second selection circuit selects at least one of the two third output ports to output a second output radio frequency signal; and
a second branch line coupler, comprising:

two fourth input ports, coupled to the third input port of the second selection circuit; and two fourth output ports, respectively used to couple the two antennas.

14. The beam switching system according to claim 13, wherein there is the second phase difference between one of the second output ports and one of the fourth output ports, and there is the second phase difference between the other one of the second output ports and the other one of the fourth output ports.

15. A beam switching method, comprising:

providing a beam switching system as described in claim 1;

generating a control signal according to a beam direction; and selecting at least one of the two first output ports according to the control signal to output the output radio frequency signal.

16. The beam switching method according to claim 15, wherein the step of selecting at least one of the two first output ports according to the control signal to output the output radio frequency signal comprises:

corresponding to a first reference direction, selecting one of the two first output ports to output the output radio frequency signal; or corresponding to a second reference direction, selecting the other one of the two first output ports to output the output radio frequency signal; or corresponding to a third reference direction, selecting the two first output ports to output the output radio frequency signal.

17. The beam switching method according to claim 15, further comprises:

selecting one of a first reference direction, a second reference direction and a third reference direction as the beam direction, wherein the first reference direction, the second reference direction and the third reference direction are $\theta$ degrees, $-\theta$ degrees and 0 degrees respectively.

18. An antenna apparatus, comprising:

two antennas;

a selection circuit, comprising:

a first input port, receiving an input radio frequency signal;

two first output ports;

a first switching circuit, its input port is coupled to the first input port, its output port is coupled to one of the first output ports, and its two reference ports are respectively coupled to a reference potential port; and a second switching circuit, its input port is coupled to the first input port, its output port is coupled to the other one of the first output ports, and its two reference ports are respectively coupled to the reference potential port, wherein the second switching circuit comprises:

a first switch, its input port is coupled to the first input port, and one of its two output ports is coupled to one of the two reference ports of the second switching circuit; and a second switch, its two input ports are respectively coupled to the other one of the two output ports of the first switch and the other one of the two reference ports of the second switching circuit, and its output port is coupled to the other one of the first output ports, wherein the selection circuit selects at least one of the two first output ports to output an output radio frequency signal; and a single branch line coupler directly coupled to the selection circuit, comprising:

two second input ports, respectively coupled to the two first output ports of the selection circuit and used to receive the output radio frequency signal; and two second output ports, respectively coupled to the two antennas.

\* \* \* \* \*